Dec. 10, 1940.  R. W. HEISLER  2,224,786
PROTECTIVE SHIELD FOR AUTOMOBILE RADIATORS
Filed Nov. 19, 1938
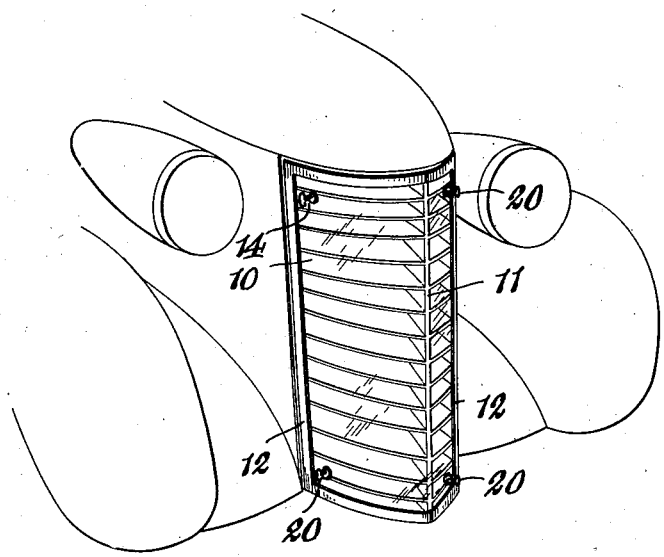
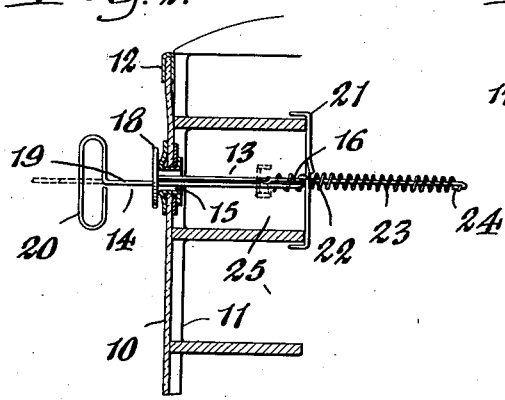
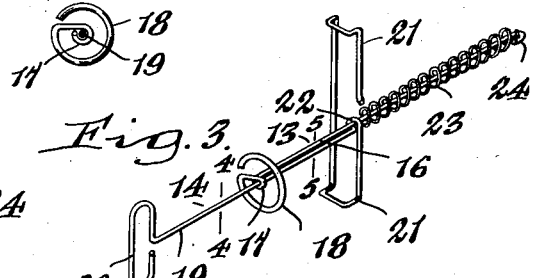
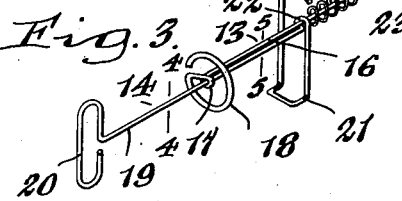
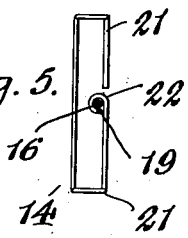
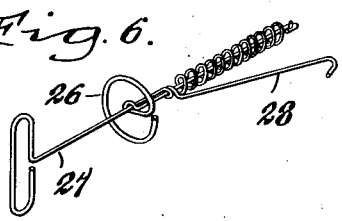
Inventor,
Robert W. Heisler,
by Walter P. Geyer
Attorney.

Patented Dec. 10, 1940

2,224,786

UNITED STATES PATENT OFFICE 2,224,786

PROTECTIVE SHIELD FOR AUTOMOBILE RADIATORS

Robert W. Heisler, Hamburg, N. Y.

Application November 19, 1938, Serial No. 241,434

5 Claims. (Cl. 24—261)

This invention relates to certain new and useful improvements in a radiator protecting device or shield for automobiles.

It has for one of its objects to provide a shield of this character which is so designed and constructed as to afford maximum protection to the radiator during winter driving and at the same time not detract from the ornamental appearance now prevalent in the design of the grilles associated with automobile radiators.

Another object of the invention is to provide a transparent winter front for the radiators or grilles of automobiles which has simple, inexpensive and reliable means for detachably anchoring or retaining the front in place on the grille.

Other features of the invention reside in the construction and arrangement of parts hereinafter described and particularly pointed out in the appended claims.

In the accompanying drawing:

Figure 1 is a perspective view of the front end of an automobile showing my improved winter front applied thereto. Figure 2 is an enlarged fragmentary vertical section taken through the protecting shield in the plane of one of the retaining clips. Figure 3 is a perspective view of one of the retaining clips constituting a part of the protecting front. Figures 4 and 5 are cross sections taken on the correspondingly-numbered lines in Figure 3. Figure 6 is a perspective view of a modified form of retaining clip.

Similar characters of reference indicate corresponding parts throughout the several views.

This improved shield or winter front has been designed to afford protection to the radiator of an automobile when driving in inclement wintry weather and yet not detract from the present attractive grille designs which constitute a part of the radiator and hood assembly of automobiles. To this end, this shield, which is made in different shapes and sizes to fit the frontal contour of the different makes of automobiles, preferably consists of a flexible sheet 10 of transparent material, such as Celluloid, isinglass, Cellophane and the like. This shield is adapted for detachable application to the radiator grille 11 and to overlie the same in accordance with the contour of the grille in the manner shown in Figure 1. The shield is normally flat and when not in use it can be conveniently rolled up into compact form for convenient storage. As shown in Figure 1, the marginal edges of the shield may be provided with suitable binding 12.

Means are applied to the protecting shield which constitute a self-contained part thereof and which serve to detachably retain the shield in proper, firm, overlying relation to the front side of the radiator grille. These retaining means may be disposed adjacent the corners of the shield, as shown in Figure 1, and each comprises a clip consisting of relatively movable members shaped from wire and indicated generally by the numerals 13 and 14 which extend through a corresponding eyeleted-opening 15 in the shield for opposing engagement with the front side of the latter and the rear edge of the grille, and which are guided for relative movement one on the other to bring them into and out of yieldable retaining or anchoring engagement with the grille. The shield-engaging retaining member 13, which constitutes a support and guide for the companion grille-engaging retaining member 14, includes a longitudinal shank 16 shaped at its front end to provide a guide-loop 17 and an abutment ring 18 which is adapted to bear against the front side of the shield, in its applied position, about the corresponding opening 15. The companion retaining member 14 includes a longitudinal shank 19 disposed parallel to and in part alongside the companion shank 16 of the retaining member 13 and guided intermediate its ends in the guide-loop 17 of such member. At its front end the shank 19 terminates in a suitable handle or finger-hold 20 while its inner or rear end is suitably shaped to provide a clamping-head 21 adapted for operative engagement with adjoining rear edge portions of the grille 11, as shown in Figure 2. This shank also terminates at its rear end, and substantially in the plane of its clamping-head 21, in a guide-loop 22 engaging the shank 16 of the retaining member 13. Coiled about the rear end of the shank 16, which extends beyond the clamping head, as shown in Figures 2 and 3, is a coil spring 23 having its rear end joined to a terminal loop 24 formed on such shank while its opposite end abuts against the guide loop 22 of the companion retaining member 14. By this construction, a reliable shield clamping means is provided which permits the user to readily and conveniently apply the shield to and remove it from the radiator grille.

The retaining members 13 and 14 are assembled to the shield 10 in threaded engagement with the corresponding openings 15 and in this connection the handle 20, which may be bent from the shank 19, is not shaped until after the assembly, and the spring 23 and its attaching loop 24 are not applied until after the assembly. In assembling the parts under the respective aforesaid conditions, the shank 16 of the shield-engaging member 13 is inserted through the respective opening 15 from its front side and the shank of the companion or grille-engaging member 14 is inserted through the opening from its rear side, with the shanks engaging the respective guide loops 17 and 22. Thereafter, the handle is shaped on the front end of the shank 19 and the spring 23 is applied to the shank 16 and anchored in place in the loop 24. Thus, the retaining members 13, 14 form a self-contained part of the shield 10 and are not liable to become lost.

In applying the shield to a radiator grille, the shield is placed over the grille and the respective retaining elements 13, 14 anchored in place in the manner shown in Figure 2. When inserting the retaining head 21 through a registering grille-passage 25, the same is turned horizontally to freely pass longitudinally therethrough, after which the handle end of the member 14 is turned to bring the head into clamped relation with the adjoining edge portions of the grille, the spring 23 effectually holding the parts in clamped position.

In the modified form of retaining clip shown in Figure 6, the same is composed of companion relatively-movable retaining members 26, 27 which are identical with those heretofore described, but instead of the type of head 21 depicted in the previous construction, this form of clip employs a single retaining hook 28 which is formed on the retaining member 27 and is adapted to hook over the rear edge of an adjoining grille-wall.

I claim as my invention:

1. Fastening means for securing a protective shield to the grilles of automobile radiators, comprising retaining clips fitted to the shield and constituting a self-contained, assembled part of the shield for detachably securing it to the grille, each of said clips including relatively movable members guided in parallel relation one to the other and having opposing clamping heads thereon for engagement with the outer face of the shield and the inner side of the grille, respectively, and a spring applied to one of said members inwardly of the clamping head of the companion member for normally urging said member and their heads into a clamping position.

2. Fastening means for securing a protective shield to the grilles of automobile radiators, comprising retaining clips fitted to the shield and constituting a self-contained, assembled part of the shield for detachably securing it to the grille, each of said clips including relatively movable members each having guide elements thereon in parallel guiding engagement with the companion member and having opposing clamping heads thereon for engagement with the outer face of the shield and the inner side of the grille, respectively, one of said members extending outwardly beyond the clamping head of the companion member and having a handle thereon and such companion member extending inwardly beyond the clamping end of said first-named member, and a spring applied to the inwardly extended portion of the said companion member and connected at one end thereto and abutting at its opposite end against the clamping head of the handle-bearing member.

3. A fastener of the character described, comprising a clip including relatively slidable, parallel members having means thereon in guiding engagement one on the other, one of said members having a clamping element at one end thereof and the other member having a clamping element at its opposing end and having an operating handle at its other end and outwardly of the head of the companion first-named member for manipulating such second-named member to bring its clamping element into and out of engaged position, and a spring operatively associated with said clip-members for normally urging them into a relative retaining position.

4. Retaining means for attaching a protective shield to a radiator-grille, comprising a pair of adjoining, parallel-disposed, relatively slidable members, one of said members including a longitudinal shank having a guide loop and a shield-abutting element thereon, and the other member including a shank guided in the loop of said first-named member and having a guide loop for receiving the shank of such first-named member and a grille-engaging head, and a spring connected to the shank of one of said members and in bearing contact with the head of the companion member for yieldingly-resisting the relative movements of said members out of a retaining position.

5. Retaining means for attaching a protective shield to a radiator-grille, comprising a pair of adjoining, parallel-disposed, relatively slidable members, one of said members including a longitudinal shank having a guide loop and a shield-abutting element adjacent the front end thereof, and the other member including a shank guided in the loop of said first-named member and having at its rear end a guide loop for receiving the shank of such first-named member and a grille-engaging head, the shank of the first-named member extending rearwardly beyond the guide loop of the companion member and having a spring thereon abutting the same, and the shank of the second-named member extending forwardly beyond the shield-abutting element of the first-named member and terminating at its front end in an actuating handle.

ROBERT W. HEISLER.